(12) United States Patent
Cox et al.

(10) Patent No.: US 7,241,163 B1
(45) Date of Patent: Jul. 10, 2007

(54) CABLE RESTRAINT

(75) Inventors: Aaron R. Cox, Tucson, AZ (US); Michael A. Curnalia, Tucson, AZ (US); Jason A. Minyard, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/539,046

(22) Filed: Oct. 5, 2006

(51) Int. Cl.
*H01R 13/56* (2006.01)
(52) U.S. Cl. .................................. 439/445; 439/373
(58) Field of Classification Search ........ 439/445–447, 439/371–373
See application file for complete search history.

(56) References Cited

U.S. PATENT DOCUMENTS

| 6,520,792 | B2 * | 2/2003 | Chen-Chiang et al. ...... 439/373 |
| 6,739,896 | B2 * | 5/2004 | Sivertsen .................... 439/371 |
| 6,811,415 | B2 * | 11/2004 | Chen ......................... 439/133 |
| 6,921,281 | B2 * | 7/2005 | Chen ......................... 439/447 |
| 6,966,527 | B2 * | 11/2005 | Komiya ...................... 248/49 |
| 7,134,902 | B1 * | 11/2006 | Lewis et al. ................ 439/373 |

* cited by examiner

*Primary Examiner*—Hien Vu
(74) *Attorney, Agent, or Firm*—Cantor Colburn LLP

(57) ABSTRACT

Disclosed is cable restraint including a flexible and resilient cable retainer including a cable retaining body and a plurality of cable grips, the body and grips defining a cable cavity that is contoured to partially house a cable, a tie down portion extending from a tie down end of the cable retainer, the tie down portion being configured to allow association of the tie down portion with an electronic enclosure, a portability handle extending from the tie down portion, a plug enclosure including a first enclosure portion and a second enclosure portion that is hinged to the first portion, and the second portion being rotatable into enclosing association with the first portion to form and define a plug cavity for disposal of a plug and a plug opening that allows the plug to associate with the electronic enclosure, and a pull handle extending from the first end portion.

6 Claims, 3 Drawing Sheets

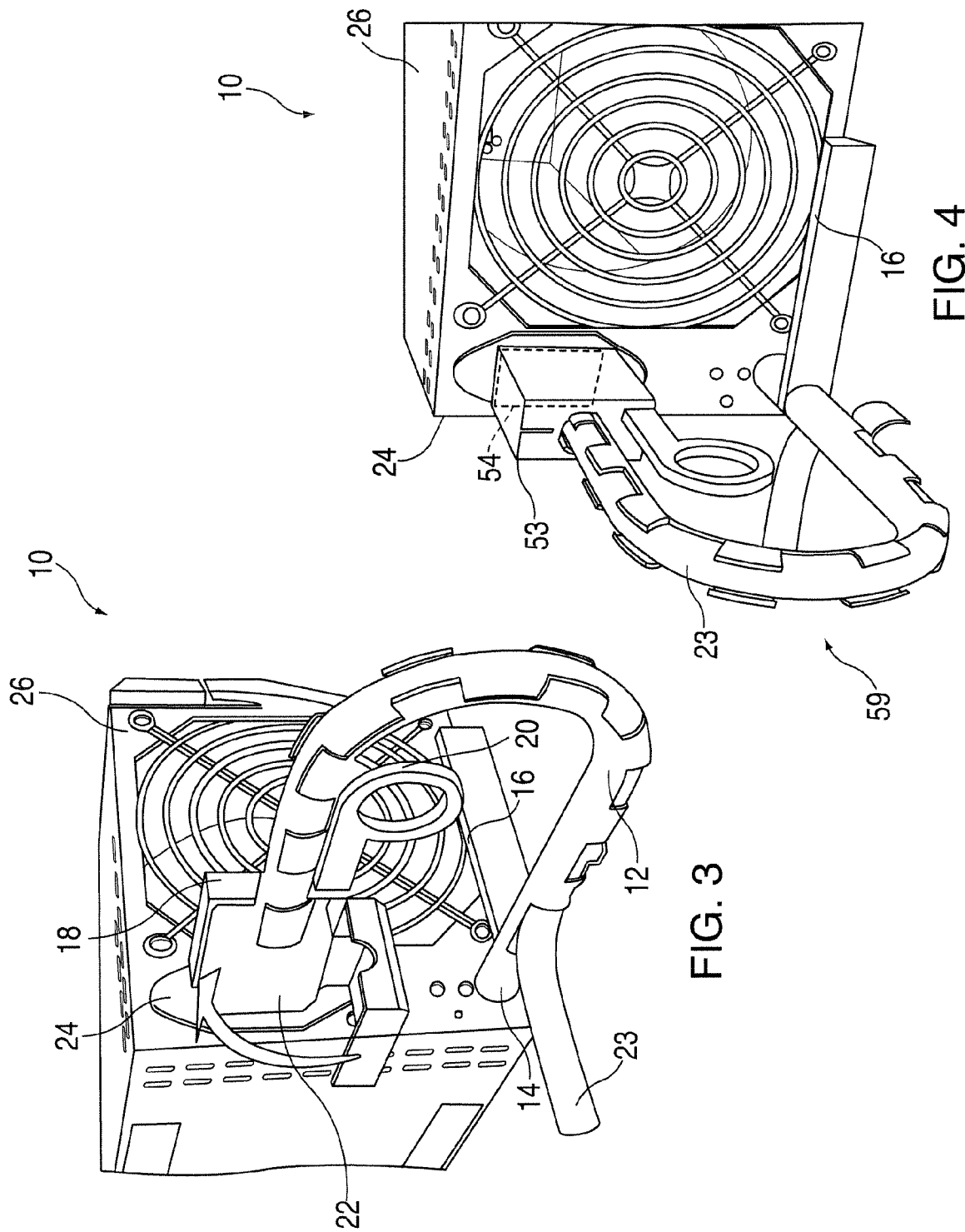

CABLE RESTRAINT

BACKGROUND OF THE INVENTION

1. Field of the Invention

The disclosure relates generally to a cable restraint, and more particularly to a cable restraint that is associable with an electronic enclosure.

2. Description of the Background

Currently, users of power supplies for information technology (IT) applications encounter issues regarding cable retention, plug release, and electronic enclosure portability. Cable retention pertains to prevention of inadvertent unplugging of a cable plug. Cable retention may conflict with safety requirements that allow for a quick disconnect of a power cord from an electronic enclosure, such as a power supply, in the event of an emergency (smoke, electrical arcing, fire). One known solution for cable retention is a cable tie down. This solution has some drawbacks however, in that the user must know, and care, to allow for presence of a service loop (extra cable length) between the tie down and the electrical outlet. Often, tie downs are installed without enough (or any) service loop, making it difficult for the cable to be unplugged in the event of an emergency. Another known solution for cable retention is a "key ring." This solution also includes some drawbacks, in that during installation of the cable, the customer may sometimes forget to feed the cable though the key ring. After the power supply is turned on, one cannot feed the cable through the round ring without unplugging the cable, which requires a power down and/or risks a fault indication that must be cleared.

Referring to plug release difficulties in known plug-outlet associations, tightly packed electronic enclosure components can lead to small clearance access for grasping a plug. If a user grabs the cable by the cable portion to pull the plug out of association with the outlet, this pulling can result in damage to the power cable. In addition, with reference to electronic enclosure portability, tightly packed components can also lead to provision of little surface space for externally attached features such as cable tie downs and/or removable handles for transporting electronic enclosures. As such a cable application that can improve cable retention, plug release, and electronic enclosure portability is desirable.

SUMMARY OF THE INVENTION

Disclosed is cable restraint including a flexible and resilient cable retainer including a cable retaining body and a plurality of cable grips that extend from the cable retaining body, the cable retaining body and the cable grips defining a cable cavity that is contoured to partially house a cable, and defining a flexible cable entry opening that allows the cable to be disposed in the cable cavity, a tie down portion extending from a tie down end of the cable retainer, the tie down portion defining a threaded cavity configured to allow threaded association of the tie down portion with an electronic enclosure, a unit removal and portability handle orthogonally extending from the tie down portion, a plug enclosure including a first enclosure portion and a second enclosure portion that is hinged to the first enclosure portion, the first enclosure portion extending from an enclosure end of the flexible cable retainer, and the second enclosure portion being rotatable into enclosing association with the first enclosure portion to form and define a plug cavity for disposal of a plug extending from the cable and a plug opening that allows the plug to access and associate with the electronic enclosure, and a pull handle extending from the first end portion, the pull handle defining a finger loop.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 is a side perspective view of the cable restraint in association with a cable and an electronic enclosure; and FIG. 4 is a back perspective view of the cable restraint in association with the cable and the electronic enclosure.

DETAILED DESCRIPTION OF THE INVENTION

Figure 1:
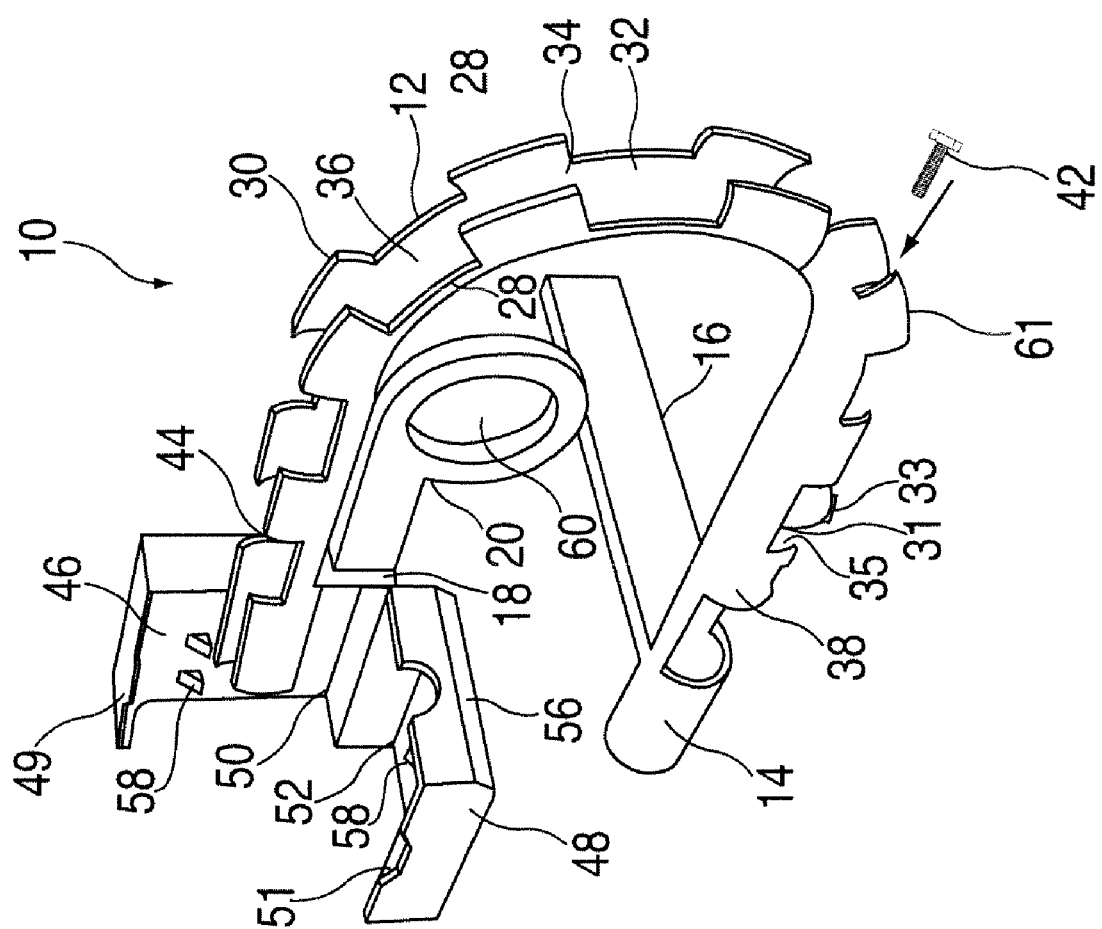
FIG. 1 is a side perspective view of a cable restraint.
Figure 2:
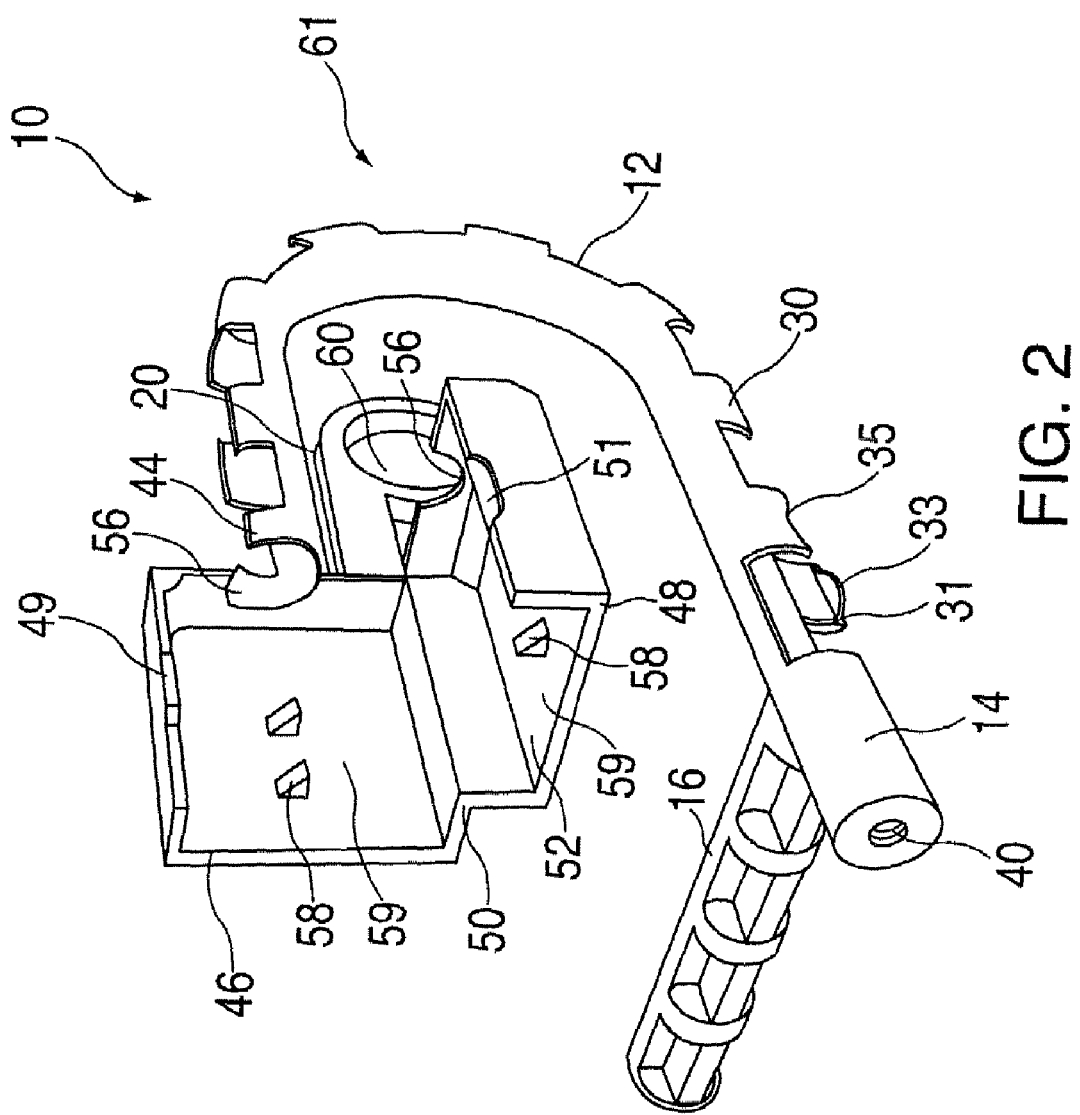
FIG. 2 is a front perspective view of the cable restraint.

Referring to FIGS. 1–4, a cable restraint 10 is illustrated. The cable restraint 10 includes a flexible cable retainer 12, a tie down portion 14, a unit removal handle 16, a plug enclosure 18, and a pull handle 20. The cable restraint 10 is configured to facilitate retention of an association between a plug 22 of a cable 23 and an outlet 24 of an electronic enclosure 26 (such as an AC power supply). In addition, the cable restraint 10 is configured to allow for a convenient and rapid release of the plug 22 from the outlet 24, particularly in an emergency situation such as smoke, electrical arcing, fire. The cable restraint 10 is further configured to provide a mechanism by which the electronic enclosure 26 may be transported.

The flexible cable retainer 12 comprises a cable retaining body 28 and a plurality of cable grips 30 that extend from the cable retaining body 28. The cable retaining body 28 and the cable grips 30 define a cable cavity 32 and a flexible cable entry opening 34. The cable cavity 32 is contoured to partially house the cable 23, as is illustrated best in FIGS. 3 and 4. The flexible cable entry opening 34 allows the cable 23 to be disposed in the cable cavity 32 via a flexibility of the plurality of cable grips 30. The cable grips 30, and cable retainer 12 in general, comprise material that is resilient and flexible (such as plastic or rubber), and allows a user to force or pull the grips 30 relatively away from each other, and out of a resting position (as shown in all of the Figures). By forcing the grips relatively away from each other, the cable entry opening 34 is expanded to a wider, open position (not illustrated) that allows entry of the cable 23 into the cable cavity 32. Being that the material of the grips 30 is resilient, the grips 30 return to the resting position once the cable 23 is disposed within the cable cavity 32, at least partially enclosing the cable 23 within the cavity 32 as shown in FIGS. 3 and 4. It should be appreciated that the cable cavity 32 includes a contour 36 that (at least when in the resting position) is configured to at least partially wrap around and house the cable 23 disposed within. It should also be appreciated that at least one of the grips 30 may be a hinged grip 31 that is hinged to the retaining body 28. The hinged grip 31 may close a portion of the cable entry opening 34 via rotation of the hinged grip 31 into association with one of the plurality of grips 30 disposed on an opposite end of the retaining body 28. This association may snap into place via a disposal of a cable snapping extension 33 extending from the hinged grip 31 into a cable snapping groove 35 defined by the grip 30 opposite the hinged grip 31. By closing in this manner, the hinged grip 31 completely wraps around the cable 23, enclosing it in this portion in the cable cavity 32.

Extending from a tie down end 38 of the flexible cable retainer 12 is the tie down portion 14. The tie down portion 14 defines a threaded cavity 40 (best illustrated in FIG. 2) that is configured to allow threaded association of the tie down portion 14 with an electronic enclosure 26. This threaded association may be achieved via an attachment instrument 42, such as a screw, that may be threaded through the threaded cavity 40 and into a threaded enclosure cavity (not illustrated) defined by the electronic enclosure 26. The threaded association fixes the tie down portion 14, and cable restraint 10 as a whole, to the electronic enclosure 26. The unit removal and portability handle 16, mentioned briefly above, extends orthogonally from said tie down portion 14 as shown in the Figures, and is used to help align the cavity 40 with the enclosure cavity, and provides a grip for pulling the tie down end 14 away from the enclosure 26 when the-attachment instrument 42 is removed.

Extending from an enclosure end 44 of the flexible cable retainer 12 is the plug enclosure 18. The plug enclosure 18 includes a first enclosure portion 46 and a second enclosure portion 48, wherein the first enclosure portion 46 extends from the enclosure end 44 of the cable retainer 12, and the second enclosure portion 48 is associated with the first enclosure portion 46 via a hinged region 50. The hinged region 50 allows the second enclosure portion 48 to rotate into an enclosing association with the first enclosure portion 46, as shown in FIGS. 3 and 4. The first enclosure portion 46 and second enclosure portion 48 may be snapped into the enclosing association via disposal of a plug snapping extension 49 extending from the first enclosure portion 46 within a plug snapping groove 51 defined by the second enclosure portion 48. Once they are associated, the first enclosure portion 46 and second enclosure portion 48 form a plug housing 53 that defines a plug cavity 52 and a plug opening 54, the plug opening 54 allowing the plug 22 to access and associate with the outlet 24 of the electronic enclosure 26. As is shown in the Figures, the first portion 46 and second portion also define cable grooves 56 that allow the cable 23 to extend from the plug 22 into the cable cavity 32 of the cable retainer 12, particularly when the plug 22 is enclosed within the plug cavity 52. It should be appreciated that each of the first portion 46 and second portion 48 may also include grip teeth 58 that extend from an inner surface 59 of the first portion 46 and second portion 48 into the plug cavity 52, wherein the teeth 58 are configured to securely grip the plug 22. As shown in FIGS. 3 and 4, when the plug enclosure 18 contains the plug 22 in association with the electronic enclosure 26, and the tie down portion is threadingly associated with the enclosure 26, the cable retainer 12 forms a handle shape 61 that may ensure proper cable bend radius. In addition, when the cable 23 is disposed in the cable cavity 32 of the flexible cable retainer 12 and associated with the electronic enclosure 26 (via the plug 22 and outlet 24), the flexible cable retainer 12 aids in cable retention.

With reference to plug release from the outlet 24, the cable restraint 10 also includes the pull handle 20, which extends from the first enclosure portion 46. The pull handle 20 defines a finger loop 60, configured for association with a users finger. The pull handle 20 allows the user to more easily pull the plug 22 from association with the outlet 24, particularly in an emergency situation.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, unless specifically stated any use of the terms first, second, etc. do not denote any order or importance, but rather the terms first, second, etc. are used to distinguish one element from another.

What is claimed is:

1. A cable restraint comprising:
   a flexible and resilient cable retainer including a cable retaining body and a plurality of cable grips that extend from the cable retaining body, said cable retaining body and said cable grips defining a cable cavity that is contoured to partially house a cable, and defining a flexible cable entry opening that allows said cable to be disposed in said cable cavity;
   a tie down portion extending from a tie down end of said cable retainer, said tie down portion defining a threaded cavity configured to allow threaded association of said tie down portion with an electronic enclosure;
   a unit removal and portability handle orthogonally extending from said tie down portion;
   a plug enclosure including a first enclosure portion and a second enclosure portion that is hinged to said first enclosure portion, said first enclosure portion extending from an enclosure end of said flexible cable retainer, and said second enclosure portion being rotatable into enclosing association with said first enclosure portion to form and define a plug cavity for disposal of a plug extending from said cable and a plug opening that allows said plug to connect with an outlet of said electronic enclosure; and
   a pull handle extending from said first end portion, said pull handle defining a finger loop.

2. The cable restraint of claim 1, wherein grip teeth extend into said plug cavity from an inner surface of said first enclosure portion and said second enclosure portion, said grip teeth being configured to grip said plug.

3. The cable restraint of claim 1, wherein a plug snapping extension extends from said first enclosure portion and is associable with a plug snapping groove defined by said second enclosure portion to snap said first enclosure portion and said second enclosure portion together.

4. The cable restraint of claim 1, wherein at least one of said plurality of cable grips is hinged to said cable body and includes a cable snapping extension that is associable with a cable snapping groove defined by at least one of said plurality of cable grips to close a portion of said cable entry opening and completely enclose a portion of said cable in said cable cavity.

5. The cable restraint of claim 1, wherein said electronic enclosure is a power supply.

6. The cable restraint of claim 1, wherein said first enclosure portion and said second enclosure portion define cable grooves.

* * * * *